US010743250B2

(12) United States Patent
Watfa et al.

(10) Patent No.: US 10,743,250 B2
(45) Date of Patent: Aug. 11, 2020

(54) NETWORK SLICE RESELECTION

(71) Applicant: IDAC Holdings, Inc., Wilmington, DE (US)

(72) Inventors: Mahmoud Watfa, Saint Leonard (CA); Saad Ahmad, Montreal (CA)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/324,700

(22) PCT Filed: Aug. 10, 2017

(86) PCT No.: PCT/US2017/046218
§ 371 (c)(1),
(2) Date: Feb. 11, 2019

(87) PCT Pub. No.: WO2018/034924
PCT Pub. Date: Feb. 22, 2018

(65) Prior Publication Data
US 2019/0223093 A1 Jul. 18, 2019

Related U.S. Application Data

(60) Provisional application No. 62/454,450, filed on Feb. 3, 2017, provisional application No. 62/375,843, filed on Aug. 16, 2016.

(51) Int. Cl.
H04W 48/18 (2009.01)
H04W 36/06 (2009.01)
(Continued)

(52) U.S. Cl.
CPC .......... H04W 48/18 (2013.01); H04W 36/06 (2013.01); H04W 36/24 (2013.01); H04W 36/12 (2013.01)

(58) Field of Classification Search
CPC ..... H04W 48/18; H04W 36/06; H04W 36/24; H04W 36/12; H04W 36/0083; H04W 60/00
(Continued)

(56) References Cited

U.S. PATENT DOCUMENTS

2018/0310238 A1* 10/2018 Opsenica ............. H04W 12/06
2019/0007899 A1*  1/2019 Vrzic ................ H04W 28/0247
(Continued)

OTHER PUBLICATIONS

LG Electronics Inc. ("Network Slice Selection considering Authentication and Authorization", 3GPP Draft; S2-163395, vol. SA WG2, no. Vienna, Austria; Jul. 11-15, 2016) (Year: 2016).*
(Continued)

Primary Examiner — Rafael Pérez-Gutiérrez
Assistant Examiner — Farid Seyedvosoghi
(74) Attorney, Agent, or Firm — Yin Shao

(57) ABSTRACT

A WTRU (102) may receive updated assistance information for network slice selection and/or reselection (410). The WTRU may apply local policies to determine when to use the updated assistance information to access a network slice (440). The WTRU may determine whether to contact an existing network slice function (470) or a new network slice function (460) to establish a connection to a network slice. Based on the determination, the WTRU may transmit different information to the network. The network slice selection and/or reselection may be initiated by a WTRU or by a network.

20 Claims, 9 Drawing Sheets

(51) Int. Cl.
  *H04W 36/24* (2009.01)
  *H04W 36/12* (2009.01)
(58) Field of Classification Search
  USPC .......................................................... 455/434
  See application file for complete search history.

(56) References Cited

U.S. PATENT DOCUMENTS

2019/0059097 A1* 2/2019 Lee ................... H04W 72/1289
2019/0364541 A1* 11/2019 Ryu ...................... H04W 72/02

OTHER PUBLICATIONS

"3rd Generation Partnership Project; Technical Specification Group Services and System Aspects; Study on Architecture for Next Generation System (Release 14)", 3GPP TR 23.799 V0.7.0, Aug. 2016, 323 pages.

Ericsson, "Solution for selection of a network slice instance", 3GPP Tdoc S2-164258; 3GPP SA WG2 Meeting #116; Vienna, Austria, Jul. 11-15, 2016, 5 pages.

LG Electronics Inc., "Network Slice Selection considering Authentication and Authorization", 3GPP Tdoc S2-163395 SA; 3GPP WG2 Meeting #116; Vienna, Austria, Jul. 11-15, 2016, 6 pages.

Nokia, "Slice assistance Information over RRC", 3GPP Tdoc R2-1706984; 3GPP TSG-RAN WG2 NR Adhoc #2; Qingdao, China, Jun. 27-29, 2017, 7 pages.

Qualcomm Incorporated, "TS 23.501: network selection of slices requested by UE for prioritization and co-existence", 3GPP Tdoc S2-174443; 3GPP SA WG2 Meeting #S2-122; San Jose Del Cabo, Mexico, Jun. 26-30, 2017, 8 pages.

Samsung, "Single value of NSSAI in RRC for CCNF(AMF) selection", 3GPP Tdoc S2- 171153; 3GPP SA WG2 Meeting #119; Dubrovnik, Croatia, Feb. 13-17, 2017, 3 pages.

ZTE, "Summary of email discussion on Slicing WT1 (i.e. NS_WT_#1) assuming one UE—one slice and fully separated slices (i.e. a basic model)", 3GPP Tdoc S2-163508; 3GPP SA WG2 Meeting #116; Vienna, AT, Jul. 11-15, 2016, 31 pages.

* cited by examiner

NETWORK SLICE RESELECTION

CROSS-REFERENCE TO RELATED APPLICATIONS

This application is a national stage application under 35 U.S.C. § 371 of International Application No. PCT/US2017/046218, filed Aug. 10, 2017, which claims the benefit of Provisional U.S. Patent Application No. 62/375,843, filed Aug. 16, 2016, and Provisional U.S. Patent Application No. 62/454,450, filed Feb. 3, 2017, the contents of all of which are incorporated herein by reference in their entireties, for all purposes.

BACKGROUND

Mobile communications continue to evolve. A fifth generation may be referred to as 5G. A 5G network may be configured to provide differentiated services through network slices. For example, the network may provide personal phone services in a first network slice, critical services (e.g., public safety) in a second network slice, and Internet of Things (IoT) services (e.g., sensors, machines, etc.) in a third network slice. A wireless transmit/receive unit (WTRU) may register with a network to access one or more of network slices.

SUMMARY

Systems, methods, and instrumentalities are disclosed for network slice selection and/or reselection. A WTRU may receive a message from a network. The message may include updated network slice information. The updated network slice information may be transmitted by the network in response to a subscription change or a mobility change associated with the WTRU, for example. The WTRU may determine that at least a first network slice being utilized by the WTRU can no longer be used by the WTRU based on the updated slice information. The WTRU may be served by a first access and mobility management function (AMF) of the network for at least the first network slice. The WTRU may have a temporary identifier that is associated with the first AMF.

The WTRU may possess network slice selection assistance information (NSSAI). The WTRU may update the NSSAI based on the updated network slice information. The WTRU may have one or more configured policies. The WTRU may determine, based on the updated network slice information and the one or more configured policies, that the first network slice should be replaced with a second network slice.

Further, the WTRU may contact a first AMF or a second AMF to establish a connection to the second network slice. The WTRU may determine whether the first AMF should serve the WTRU for the second network slice. If the WTRU determines that the first AMF should serve the WTRU for the second network slice, the WTRU may transmit a connection or registration message comprising the updated NSSAI to the first AMF. If the WTRU determines that the first AMF should not serve the WTRU for the second network slice, the WTRU may delete the temporary identifier associated with the first AMF and transmit a connection or registration message comprising the updated NSSAI to the second AMF.

The updated NSSAI may identify a type of service provided by the second network slice. The type of service may include at least one of an enhanced Mobile Broadband (eMBB) service, an ultra-reliable low latency communications (UR-LLC) service, or a massive Internet of Things (mIoT) service. The policies configured for the WTRU may include information regarding a list of network slices that the WTRU is permitted to access. The WTRU may determine to replace the first network slice with the second network slice upon selecting the second network slice from the list of network slices that the WTRU is permitted to access.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
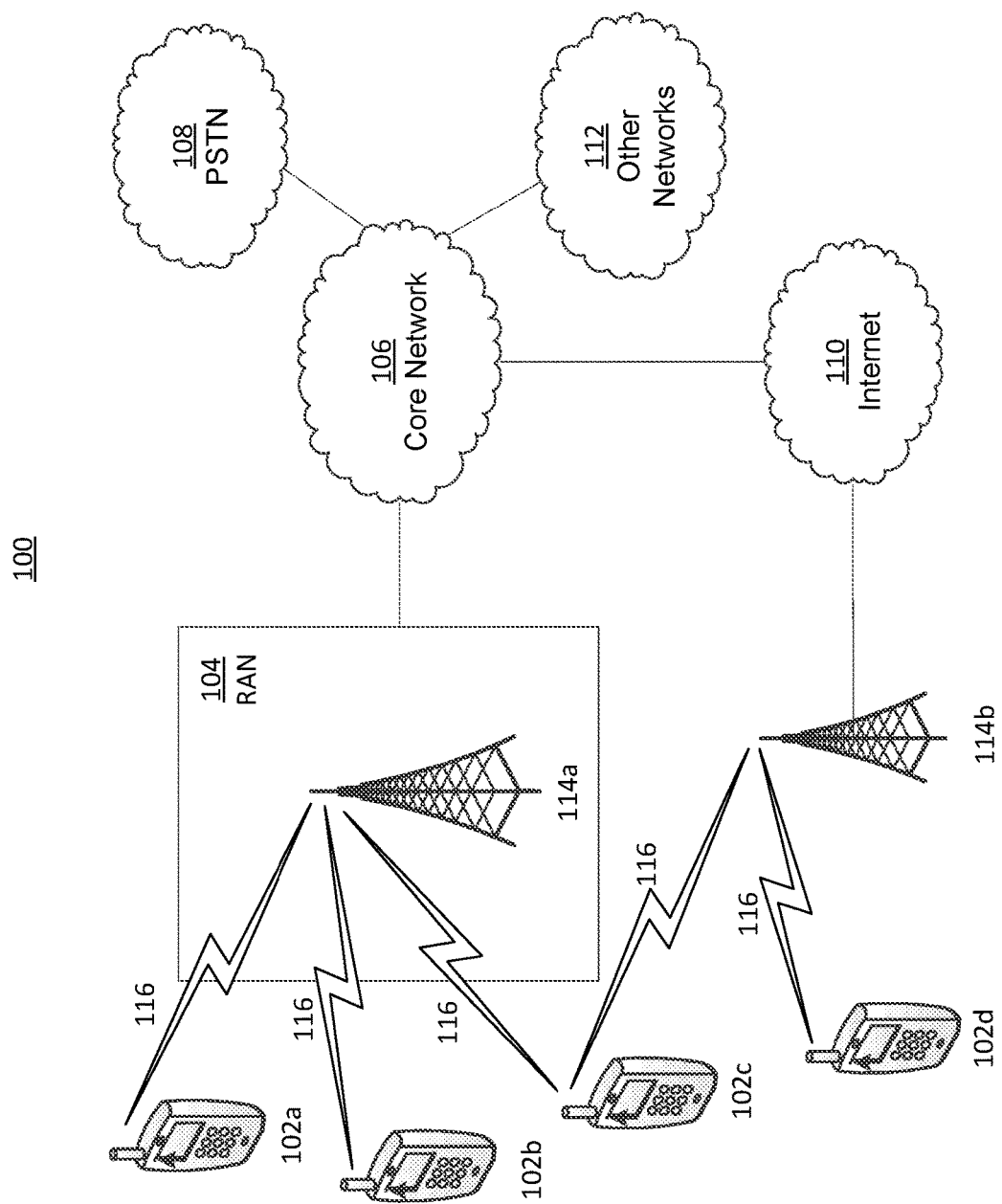
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
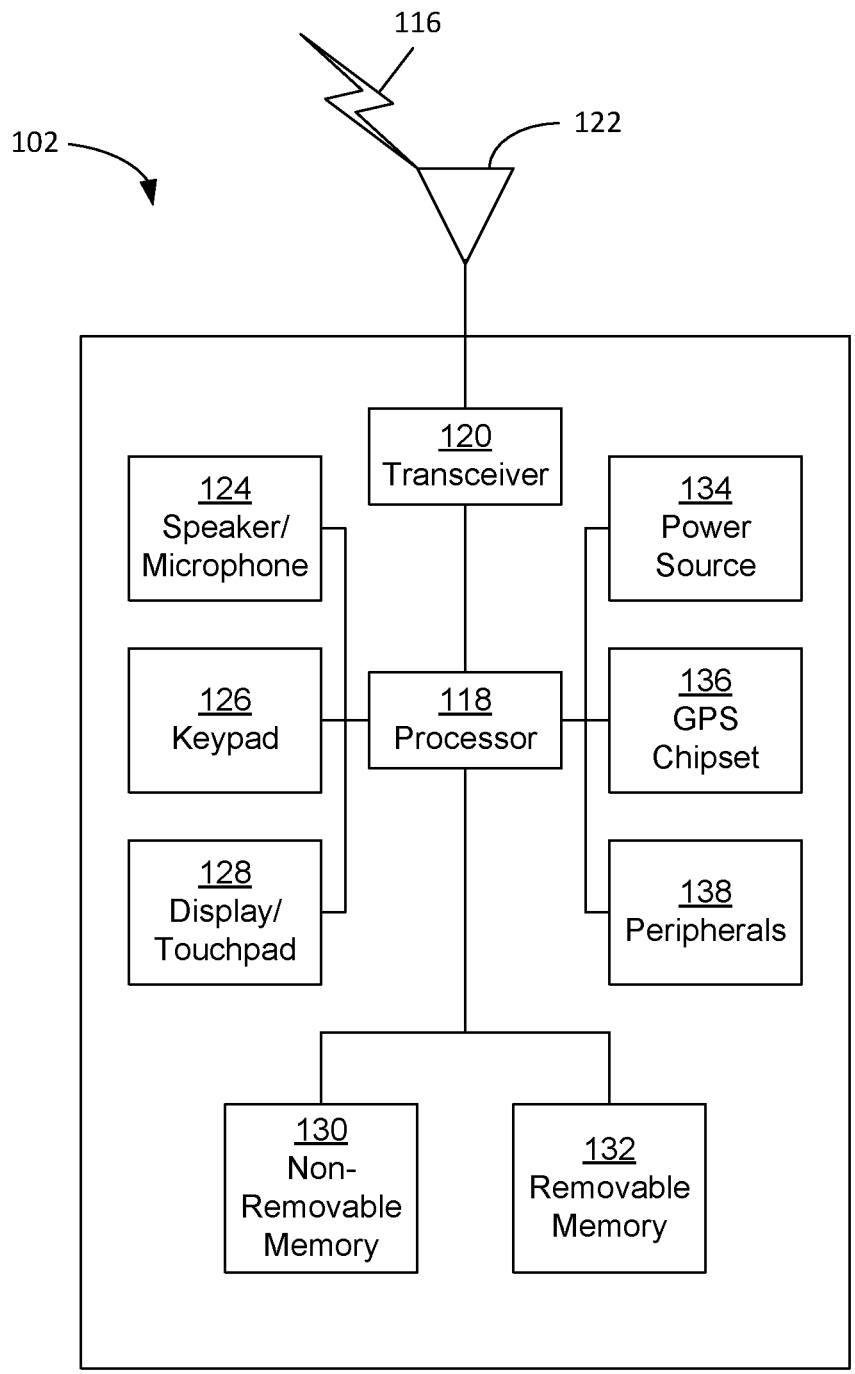
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
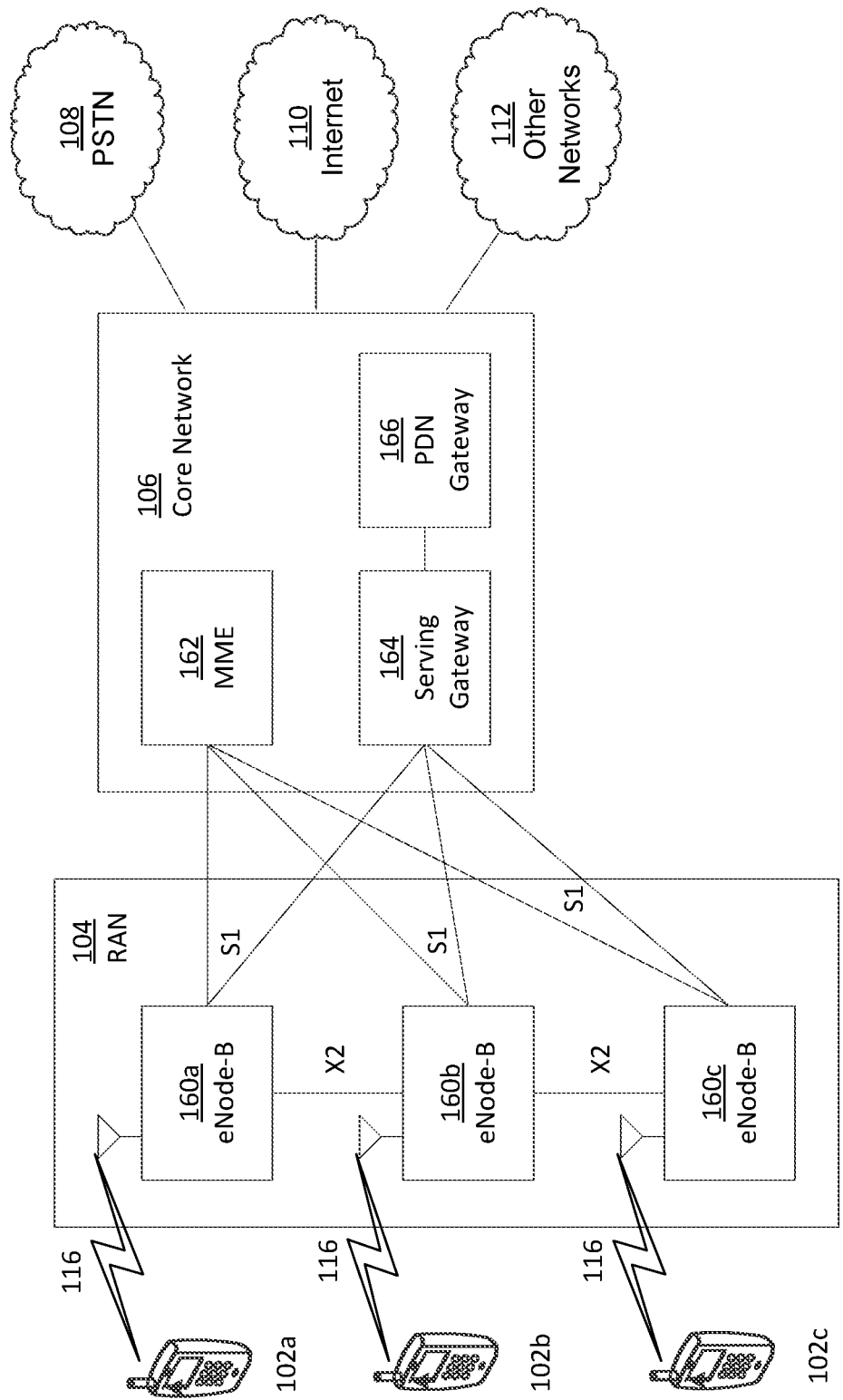
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
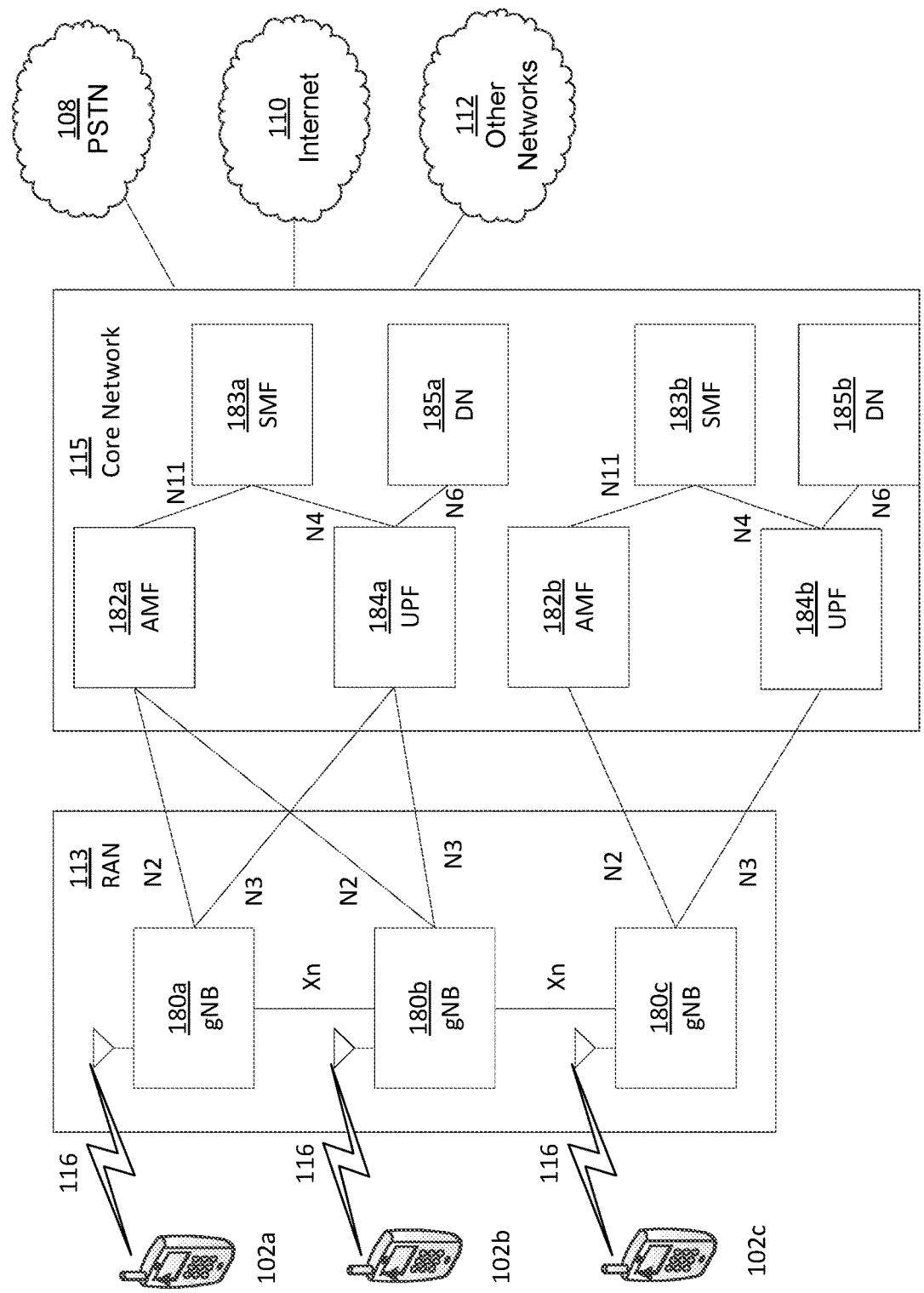
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A communication network as described herein may be configured to include multiple network slices, for example, as a way to virtualize the communication network. In a virtualized communication network, WTRUs may receive differentiated services provided with virtual and/or dedicated resources. For example, a first network slice may be used to provide services for smartphones. A second network slice may be used to provide critical services such as public safety services. A third network slice may be used to provide IoT services to sensors, machines, and/or the like.

Figure 2:
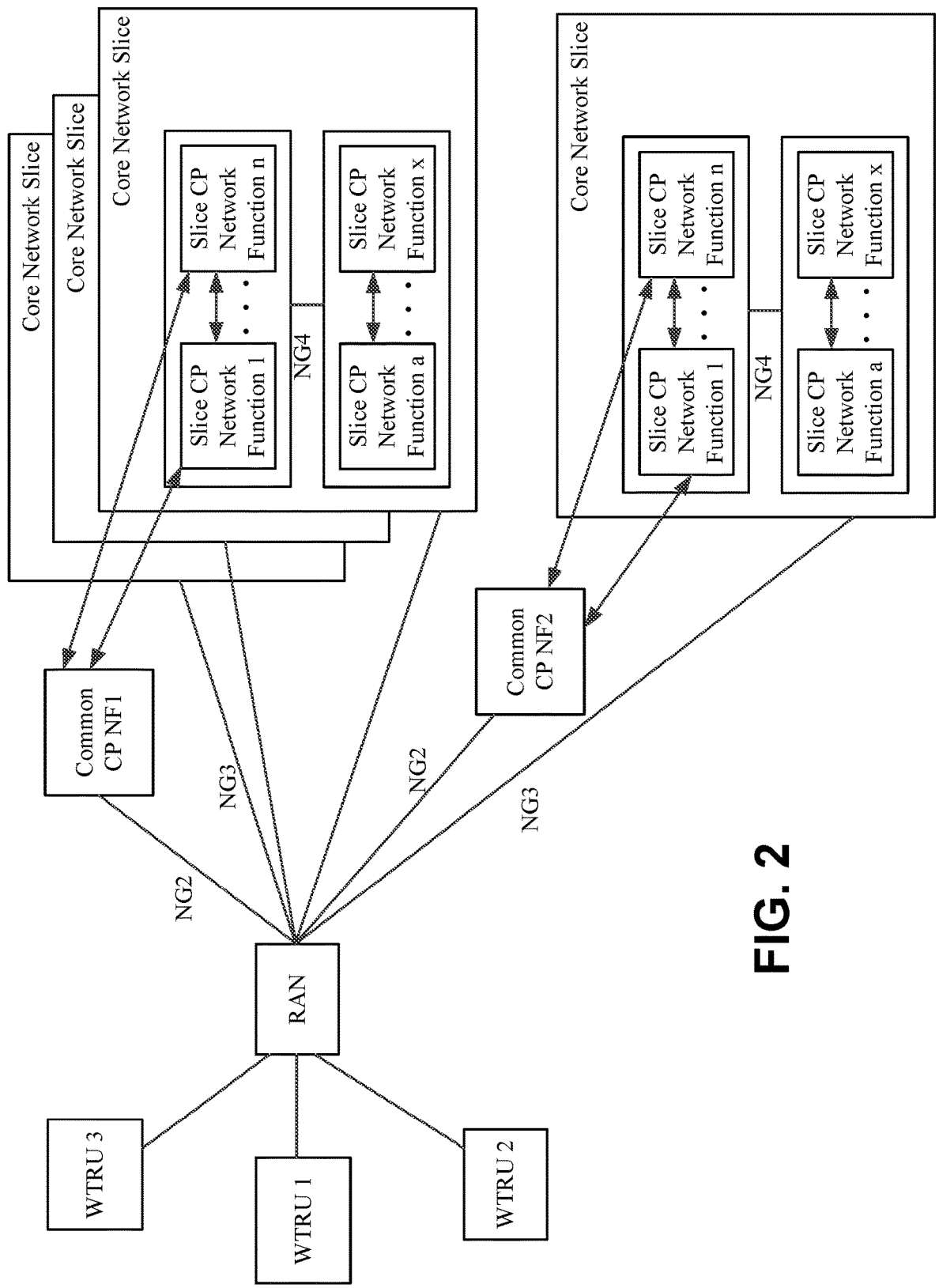
FIG. 2 shows an example of a network slicing architecture.

FIG. 2 shows an example architecture for network slicing. The example architecture may include a shared radio access network (RAN) and one or more network slices. A network slice may include an Access and Mobility Management Function (AMF), which may also be referred to herein as a Common Control Plane (CP) Network Function (CCNF). A network slice may include one or more Core Network (CN) Slices (CNS's). The AMF may host functions such as authentication and/or mobility management functions related to a network slice. The CNS may host functions (e.g., slice CP network functions) such as session management functions. A WTRU may, e.g., upon registering with a network, be allocated and/or served by an AMF (e.g., with respect to at least one network slice). The WTRU may be provided with a temporary identifier (ID) that identifies the WTRU, the AMF, and/or the association between the WTRU and the AMF.

The RAN may be configured to direct a registration message transmitted by a WTRU to an AMF. The direction may occur, for example when a WTRU first accesses (e.g., registers with) the network, and may be based on network slice selection assistance information (NSSAI) provided by the WTRU. NSSAI may be referred to herein as and used interchangeably with assistance information and/or network slice assistance information. The AMF may authenticate and/or register the WTRU upon receiving the registration message directed by the RAN. A network slice selection function (NSSF) may be configured to select one or more network slices for the WTRU. The NSSF may reside within (e.g., be a part of) the RAN and/or the AMF. The NSSF may also be independent from the RAN and/or the AMF.

Network slice selection may be made based on various factors including, for example, assistance information provided by a WTRU, local policies configured for a network and/or a WTRU, subscription information associated with a WTRU, the capabilities of a WTRU, and/or locality information associated with a WTRU. The selection of a network slice may cause a binding between an AMF that is serving the WTRU and at least one CNS.

A WTRU may be configured (e.g., by a network) with assistance information during various stages of the WTRU's operation. For example, a WTRU may receive assistance information from a network during a registration procedure with a network. A WTRU may also receive assistance information through an open mobile alliance (OMA) device management (DM) procedure and inform a network about the received assistance information. The WTRU may store the assistance information it receives, and may subsequently update the stored assistance information (e.g., based on new or updated information received from the network). The WTRU may provide the original or updated assistance information to a network node (e.g., a RAN, an AMF, an NSSF, etc.) to request access to a network slice. The network node (e.g., a RAN, an AMF, an NSSF, etc.) may use the assistance information provided by the WTRU to select a network slice for the WTRU.

The assistance information described herein may include one or more of the following. The assistance information may include an application identity. The assistance information may include a tenant identity (e.g., which may identify an application service provider). The assistance information may include a WTRU usage class. The assistance information may include a device type. The assistance information may include an identifier of a network type (e.g., which may identify a service provided by the network).

The tenant identity may identify a company (e.g., an application service provider) that may be using the network to provide certain types of services. The WTRU usage class may refer to differentiated services (e.g., services related to Massive IoT, Enhanced Mobile Broadband (eMBB), and/or Critical Communication (CriC), etc.). The device type may indicate, for example, whether a device is a smartphone, an MTC device, etc. The device type may include a sub-type. For example, the sub-type may indicate that an MTC device is located in a vehicle. The device type may include one or more service sub-types. The service sub-types may indicate, for example, that the device supports low latency and high data rate services such as entertainment services, or that the device supports low data rate and low mobility (e.g., which may be the case for a sensor-type MTC device). An identifier of a network type may indicate whether the network support for certain types of devices. For example, an "MTC network" may be used to identify a network to which an MTC device may access.

In certain cases, a WTRU may not have assistance information when it registers with a network. In certain cases, a WTRU may be in possession of assistance information but may request a PDN connection with a network (e.g., since the network may allow the WTRU to register with the network without an IP address). The network and/or the WTRU may be configured with one or more rules regarding whether and/or how the network and/or the WTRU may use assistance information that may become available to the WTRU after the WTRU has registered with the network.

For example, a network (e.g., an AMF, a RAN, an mobility management function, etc.) may be configured to receive an NAS message (e.g., such as an attach or registration message) from a WTRU. The network may receive the NAS message with or without assistance information provided by the WTRU. The network may evaluate (e.g., verify) the WTRU's subscription, local policy, capability (e.g., networking capability), and/or other information to determine a set of suitable (e.g., allowable) assistance information for the WTRU (e.g., even if the WTRU has included assistance information with the NAS message). The assistance information determined by the network may affect which network slice(s) the WTRU may be allowed to access. Actual selection of a network slice in accordance with the assistance information may occur at a later time, for example when the WTRU desires to use that network slice or services provided by that network slice.

A network may determine which network slice(s) a WTRU may be allowed to access and/or the assistance information corresponding to those slice(s) on a per-slice basis. The network may store information regarding the allowed slice(s) and their corresponding assistance information, e.g., as part of the WTRU's context. The network may perform the determination and storage when services or connections associated with the slice(s) are not yet requested, for example.

When a WTRU registers with a network, the network may verify whether the WTRU is requesting a connection with and/or a service from the network. If so, the network may verify whether the connection and/or service can be provided by a network slice that the network determines to be suitable (e.g., allowable) for the WTRU. If such a suitable network slice exists, the network may select the network slice to provide the connection and/or service requested by the WTRU. The network may set up the WTRU's connection with the suitable network slice (e.g., with one or more nodes of the suitable slice such as with an SM function of the network slice).

A network may indicate to a WTRU (e.g., configure the WTRU with) a list of allowed NSSAIs. The network may provide the indication (e.g., configuration) in an NAS message sent to the WTRU (e.g., such as an attach accept message). The network may indicate in the NAS message which network slice(s) may have a connection(s) that has already been set up for the WTRU.

A WTRU may treat the assistance information it receives from a network, e.g., as part of NAS signaling or in a response message from the network (e.g., an attach accept response message), as the latest assistance information. The WTRU may update its existing assistance information, if any, with the received information. The WTRU may perform the update even if the WTRU has initially sent assistance information to the network. The WTRU may create and/or update local policies in accordance with received assistance information. For example, the WTRU may update its local policies to include a list of network slices that the WTRU may be allowed to access (e.g., based on allowed NSSAIs).

A WTRU may inform a higher layer about received assistance information. A WTRU may use and may include the latest assistance information received from a network when the WTRU requests a connection with or a service from a network slice. A WTRU may be configured with policies that may indicate whether received assistance information may or may not be used when the WTRU requests a connection or service. A WTRU may send a request for a connection or service without including assistance information. A network may select a suitable slice (e.g., a default slice such as a default NSI) for a WTRU, e.g., when the WTRU does not include assistance information in a connection and/or service request.

Figure 3:
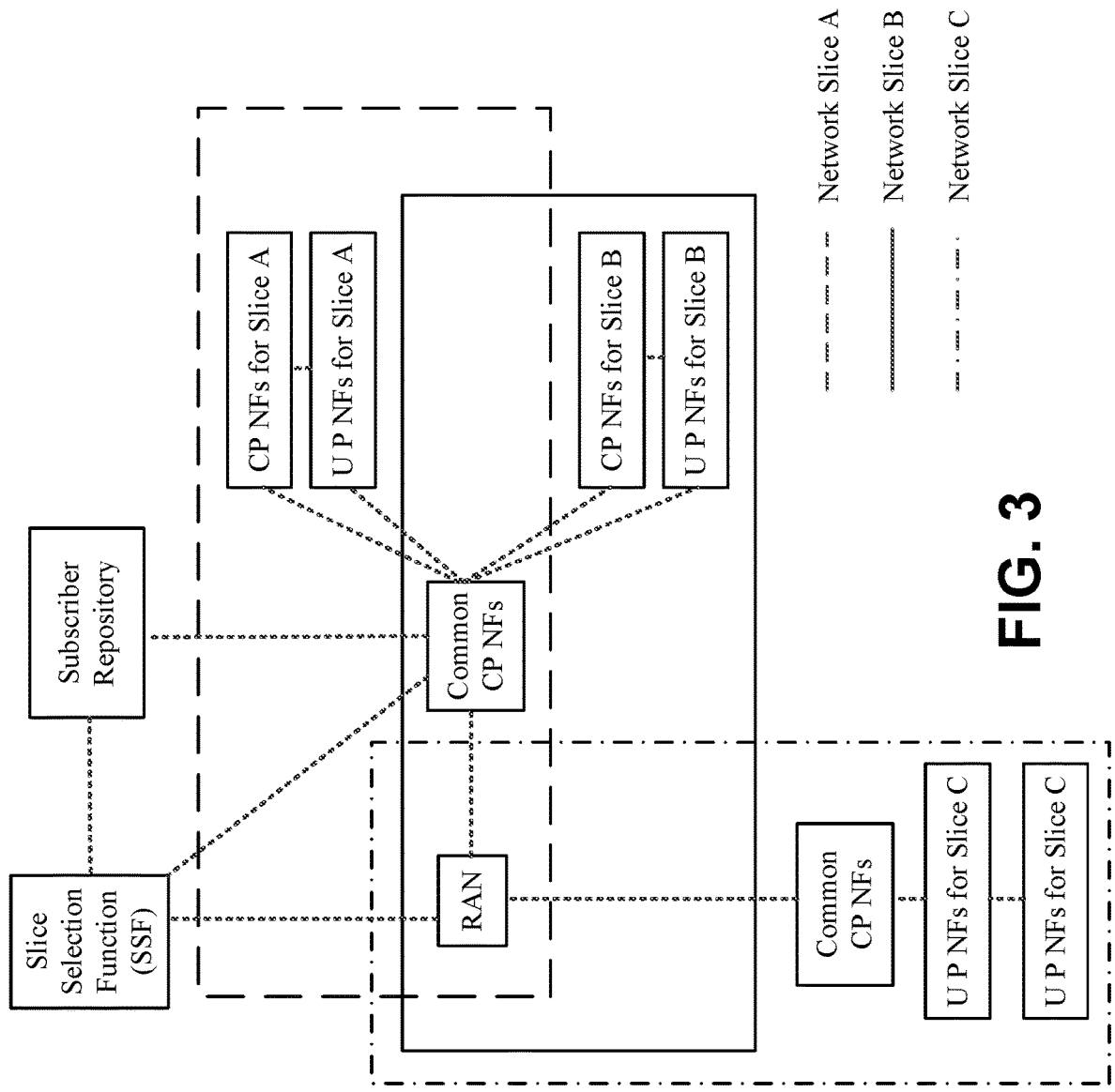
FIG. 3 shows another example of a network slice architecture with an independent network slice selection function (NSSF).

FIG. 3 shows another example of a network slice architecture. In this example architecture, an NSSF function is shown as a logical function that is independent of a RAN or a CCNF (e.g., an AMF). Such an NSSF may be referred to herein as a slice selection function or SSF, for example. Using the example architecture of FIG. 3, a network slice may be configured to include (e.g., as a concatenation of) a RAN, a CCNF and one or more CNS's. A WTRU may be configured to receive services (e.g., simultaneously) from one or more network slices. In such scenarios, the WTRU may be capable of communicating with the RAN, the CCNF, and the multiple network slices.

A WTRU may register with a network and may access one or more network slices. Once associated with the one or more network slices, the WTRU may experience changes with its configuration, operational parameters, subscription, service requirements, service/application providers, and/or the like. For example, an MTC device may be configured to be less mobile, and as such the device's current selected network slice may be tailored for stationary MTC devices. However, the service requirements associated with the MTC device may change, and the device may start moving more often than before. Such service requirement changes may lead to a network slice change for the MTC device. For example, a new slice capable of handling higher mobility and/or higher rate of communication on the user plane may be selected for the MTC device.

One or more of the following may occur during network slice reselection. The network may determine that there is a new service requirement. The network may decide whether part or all of a network slice may be re-selected. The network may provide a WTRU with new (e.g., updated) assistance information that may reflect a new service requirement, and may instruct the WTRU to re-register with the updated assistance information, e.g., so that a new network slice may be selected to serve the WTRU. Upon receiving the new information, the WTRU may acknowledge the receipt to the network. The network may allow a WTRU to move to a new network slice on an as-need basis. The movement (e.g., switching between network slices) may be due to a subscription change implemented by an application service provider, for example.

Slice reselection may be initiated by a WTRU, for example, after the WTRU has been associated (e.g., simultaneously associated) with one or more network slices. The WTRU may possess network slice selection assistance information (NSSAI) that corresponds to the one or more network slices associated with the WTRU. For example, the WTRU may possess multiple sets of NSSAI, each corresponding to a network slice associated with the WTRU (e.g., each set of assistance information may uniquely identify a network slice). The multiple sets of NSSAI may be provided to the WTRU by a network, for example in a registration procedure with the network or upon connecting to the respective one or more network slices.

Subsequent to being associated with the one or more network slices, the WTRU may receive, from the network, updated assistance information. The updated assistance information may be included in one or more messages transmitted by the network. The updated assistance information may indicate a change associated with a network slice that is currently serving the WTRU. The change may include, for example, a change in the subscription information of the WTRU, a change in the mobility of the WTRU, a change in a service type provided by an existing network slice, a change in a service type associated with data transmitted to and/or from the WTRU, a change in a priority of the data transmitted to and/or from the WTRU, a change in an operating condition of the network, and/or the like. The WTRU may receive the updated assistance information via OMA DM, via a short message service (SMS), or via other higher layer protocol. The updated assistance information may trigger the WTRU to reselect (e.g., to modify) one or more of the network slices that the WTRU is currently registered with.

A WTRU's behavior with respect to network slice selection and/or reselection may be controlled by one or more configurations of the WTRU. Such configurations may be received by the WTRU in an initial registration procedure with the network and/or during normal operation of the WTRU after the WTRU has registered with the network. The configurations may control respective priorities assigned (e.g., mapped) to one or more sets of assistance information. For example, higher priorities may be assigned to URLLC slices, lower priorities may be assigned to eMBB slices, etc. The configurations may define local policies for the WTRU, which may in turn dictate how (e.g., when and/or in what type of situations) the WTRU may select, reselect, and/or access a network slice. The WTRU may be configured to check its local policies upon receiving a set of assistance information and determine, based on those policies, an appropriate action to take with the assistance information.

The local policies of a WTRU may control when the WTRU may use a set of assistance information (e.g., updated assistance information) to gain access to a corresponding network slice. For example, the local policies of a WTRU may dictate whether the WTRU may use a set of assistance information immediately upon receiving the assistance information, or after the WTRU has contacted the network for a certain purpose (e.g., to inform the network about the assistance information, to perform periodic registration, etc.). In an example, the WTRU may decide to use a set of assistance information to connect to a network slice immediately after receiving the assistance information if the WTRU determines, based on a local policy associated with the assistance information, that the assistance information is configured with immediacy. In an example, the WTRU may decides to use a set of assistance information to connect to a network slice immediately after receiving the assistance information if the WTRU determines, based on a local policy associated with the assistance information, that the network slice has a higher priority than the priority of a network slice currently serving the WTRU. In an example, the WTRU may delay acting upon a set of received assistance information if the WTRU determines, based on a local policy associated with the assistance information, that no immediate action is necessary or when the priority of the assistance information is lower than that of a current network slice serving the WTRU.

In the case where a WTRU decides to delay acting upon a set of assistance information, the WTRU may delay the action until the WTRU has an opportunity to contact a network to inform the network about the assistance information. The opportunity to contact the network may arise for a variety of reasons including, for example, transmitting mobile originated (MO) data (e.g., uplink data) or mobile terminated (MT) data (e.g., downlink data), network paging, periodic registration, and/or the like.

The local policies of a WTRU may control which set of assistance information may be used by the WTRU, thereby controlling which network slice(s) the WTRU may connect to at a given time. For example, the local policies of the WTRU may include a list of allowed NSSAIs (e.g., NSSAIs supported by the WTRU's current serving network). The list of allowed NASSIs may be generated when the WTRU registers (e.g., via an attachment procedure) with the serving network and/or during normal operation of the WTRU after the WTRU has already registered with the network. The WTRU may store the list of allowed NSSAIs in a memory of the WTRU (e.g., as part of the local policies of the WTRU). Upon receiving updated assistance information, the WTRU may check its local policies and determine whether the updated assistance information is among those allowed by the local policies (e.g., supported by the current serving network). If the WTRU determines that the updated assistance is allowed, the WTRU may send a request (e.g., a session management request) to the serving network to request a connection to a network slice that corresponds to the updated assistance information. The connection request may include a part or the entirety of the updated assistance information, for example.

Although the usage of assistance information and the selection and reselection of a network slice is described in the examples above as being controlled by a WTRU's configurations such as local policies, the WTRU's behavior may also be controlled by information included in the assistance information itself. For instance, the assistance information may include an instruction for the WTRU to use a timer to control when the WTRU may begin using the assistance information. The assistance information may specify a duration of the timer, which may cause the WTRU to wait until the specified duration has expired before using the assistance information.

Upon receiving updated assistance information, a WTRU may, e.g., based on local policies and/or information included in the updated assistance information, start a timer before taking a next action. The timer may indicate (e.g., dictate) when the WTRU may inform a network (e.g., a different AMF) about the updated assistance information and/or when the WTRU may use the updated assistance information to connect to a corresponding network slice. The WTRU may inform a network (e.g., a different AMF) about the updated assistance information through mobile originated signaling. The mobile originated signaling may be unrelated to other signaling or events that may require signaling between the WTRU and the network.

The duration of the timer described above may be pre-configured for the WTRU or may be indicated in the updated assistance information. The duration of the timer may vary in accordance with the priority of the assistance information. For example, the duration of the timer may be set to a short value (e.g., including a zero value, which may indicate immediacy) when the priority of the assistance information is high (e.g., higher than that of the slice(s) currently serving the WTRU). When the priority of the assistance information is low (e.g., lower than that of the slice(s) currently serving the WTRU), the duration of the timer may be set to a long value.

The WTRU may enter a connected mode for various reasons before the timer described above expires. For example, the WTRU may enter the connected mode to transmit and/or receive mobile originated (MO) and/or mobile terminated (MT) data or control information. In those scenarios, the WTRU may be configured to include (e.g., piggyback) network slice related information in messages that are transmitted for MO and/or MT communication purposes.

A WTRU may be configured to, upon receiving updated assistance information, replace the WTRU's current assistance information with the updated assistance information, or update the current assistance information based on the updated assistance information. For example, the WTRU may replace the current assistance information with the entirety of the received assistance information. The WTRU may also use a portion of the received assistance information to update the current assistance information. The WTRU may be permitted to replace or update the current assistance information at any time after the WTRU receives the updated assistance information. The WTRU may inform a higher layer (e.g., higher layer applications) about potential adjustments to network slices, services, and/or connectivity. The WTRU may inform a user of the WTRU about the potential adjustments, for example by displaying information regarding the potential adjustments to the user.

A WTRU may, upon determining that a new network slice is to be selected or that one or more existing network slices are to be replaced, send a control plane message such as a non-access stratum (NAS) message to the network that is serving the WTRU. The control plane message may indicate a desire to connect to a new network slice or to replace an existing network slice. The WTRU may determine whether to use an existing AMF (e.g., an AMF currently serving the WTRU) or a new AMF for the network slice selection and/or replacement. The WTRU may make the determination based on information included in updated assistance information (e.g., as will be described in greater detail below), and/or based on local policies. For example, the WTRU may be pre-configured with a local policy indicating that the WTRU should contact a new AMF for network slice reselection.

If the WTRU determines that an existing AMF may be used, the WTRU may include a temporary ID that is associated with the existing AMF in the control plane message. As described above, the temporary ID may be provided to the WTRU in a registration procedure with the serving network to identify the WTRU and/or the association between the WTRU and the AMF. The WTRU may also include the updated assistance information and/or an indication(s) of a priority and/or policy associated with the updated assistance information in the control plane message.

If the WTRU determines that a new AMF is to be used, the WTRU may not include a temporary ID in the control plane message. Such omission may trigger the network to select a new AMF, for example. The WTRU may include the updated assistance information (e.g., a portion or the entirety of the updated assistance information) and/or an indication(s) of a priority and/or policy associated with the updated assistance information in the control plane message.

A WTRU may, e.g., upon receiving updated assistance information and/or based on local polices, send a request to deactivate a connection with a network slice (e.g., to detach from the network slice). For example, the WTRU may send the deactivation request when the updated assistance information indicates that the WTRU's existing assistance information associated with the network slice has become obsolete, when the WTRU determines that the updated assistance information is not supported by the network slice, etc. The WTRU may indicate, e.g., in the deactivation request, a reason for the deactivation. For example, the WTRU may indicate that it is detaching itself from the network slice due to a change in assistance information or because the network slice does not support updated assistance information received by the WTRU.

After detaching from a network slice, the WTRU may re-attach itself to the same or a different network slice using the updated assistance information. The WTRU may provide the updated assistance information to a lower layer. The WTRU may include the updated assistance information in a NAS message. The WTRU may delete a temporary ID (e.g., which may represent the WTRU's identity) associated with the detached network slice so that the RAN no longer routes messages (e.g., NAS messages) to that network slice.

Figure 4:
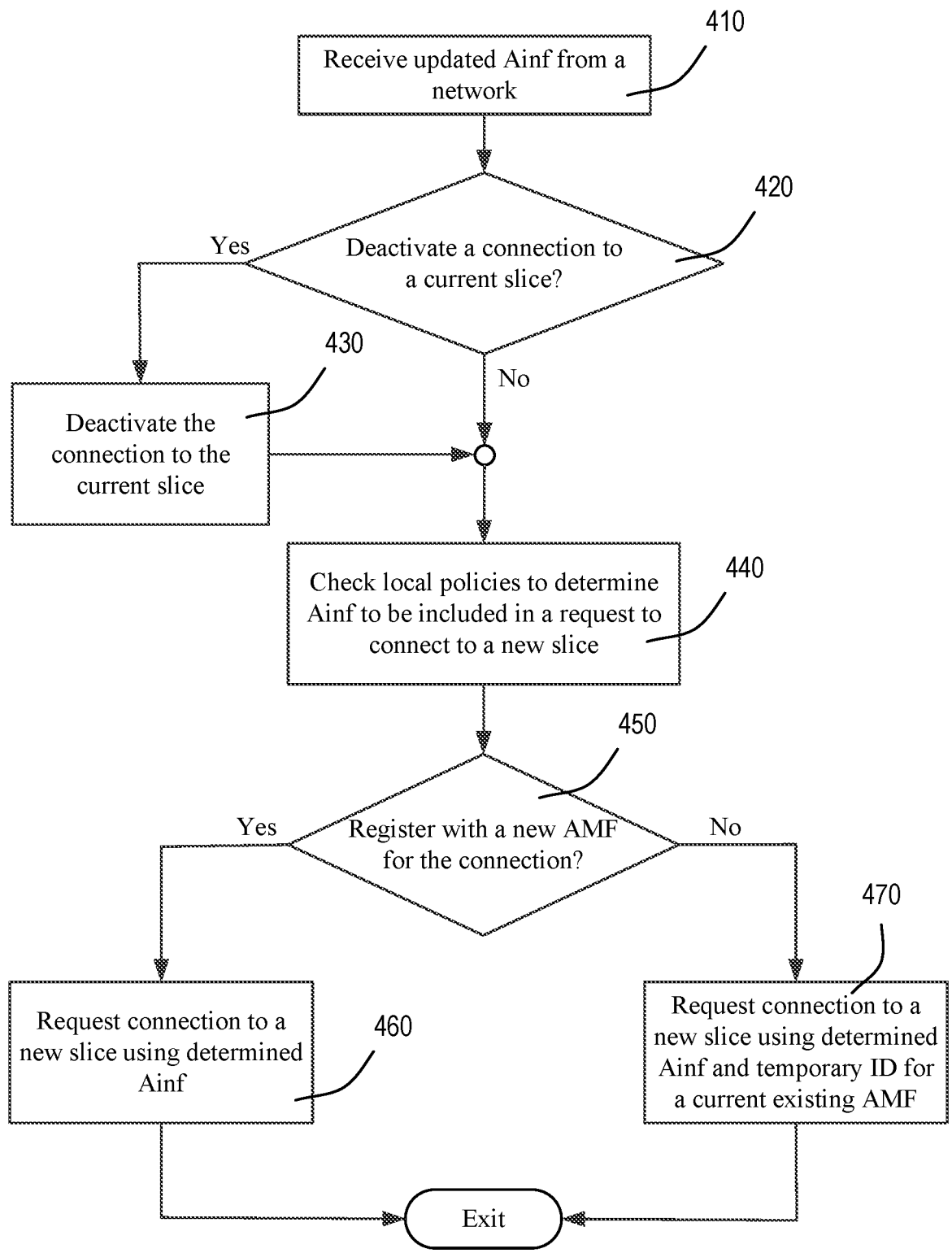
FIG. 4 shows an example of WTRU-initiated network slice reselection.

FIG. 4 shows an example of WTRU-initiated network slice reselection. At 410, a WTRU may receive updated assistance information (Ainf) from a network. The updated Ainf may be included in one or more messages transmitted by the network, for example. At 420, the WTRU may determine, based on the Ainf, whether a connection to a current network slice (e.g., a slice that is serving the WTRY) should be disconnected. The WTRU may decide to disconnect from a current slice when the Ainf indicates that a service requirement (e.g., a latency requirement) for the WTRU has changed, for example. If the WTRU decides to disconnect from the current slice at 420, the WTRU may, at 430, deactivate the connection to the current slice.

If the WTRU decides not to disconnect from the current slice at 420, the WTRU may, at 440, check local policies to determine what type of Ainf, if any, should be included in a request to connect to a new network slice. For example, the local policies may include a list of allowed Ainfs and the WTRU may only send an Ainf if it is on the list. At 450, the WTRU may determine, e.g., based on the updated Ainf received, whether it should register with a new AMF to establish a connection to the new network slice. If the WTRU determines at 450 that it should register with a new AMF, the WTRU may send a registration request to the new AMF in which the WTRU may include the Ainf determined at 440. The WTRU may delete the temporary ID associated with the existing AMF if the request is to be sent to a new AMF. If the WTRU determines at 450 that it can use an existing AMF rather than a new AMF, the WTRU may send a slice connection request to the existing AMF in which the WTRU may include the Ainf determined at 440 and a temporary ID associated with the existing AMF.

Network slice reselection for an WTRU may be initiated by a network such as by a RAN, an AMF and/or a CNS. The network may take one or more actions related to the slice reselection individually or in combination. For example, the network may determine that a slice (e.g., an AMF and/or a CNS) associated with the WTRU may be changed or replaced. The determination may be based on one or more of the following, for example. The determination may be based on updates of the network's policies. The determination may be based on the network receiving updated subscription information associated with the WTRU (e.g., from a subscriber database). The determination may be based on the network receiving a request from another network component (e.g., a SM function) to reselect a slice for the WTRU, for example due to changing load conditions. The determination may be based on the network receiving updated assistance information from the WTRU. Such assistance information may include the WTRU's local policies and/or subscriber information, for example.

A network may include an NSSF configured to determine which network slice(s) may be assigned to a WTRU. The NSSF may be an independent logical function, e.g., as shown in FIG. 3. The network may receive updated assistance information from a WTRU, and may forward the updated assistance information to the NSSF and request the NSSF to select a network slice for the WTRU. The NSSF may use the assistance information in combination with other policies and/or information when selecting a network slice for the WTRU. Once the network slice has been selected, the NSSF may provide the network with information regarding the newly selected network slice. Such information may include the identity of a new AMF (e.g., an AMF address), a new CNS address, a new CNS type, etc.

The network may process the information received from the NSSF. The processing may include determining whether a current AMF and/or a CNS with which the WTRU is associated may continue to serve the WTRU, or other CNS(s) and/or AMF(s) should be selected for the WTRU. When referred to herein, an AMF may correspond to any function within the AMF.

If the network determines that a current AMF may continue to serve the WTRU, the network may further determine whether an existing CNS for the WTRU should be changed and/or whether other CNS(s) should be selected for the WTRU. The other CNS(s) may correspond to a network slice that is capable of providing and/or managing the WTRU's connection to the network, a network slice that hosts an SM function, and/or the like. If the network determines that no other CNS(s) is to be selected for the WTRU, the network may stop the reselection process and may send the WTRU assistance information. The assistance information may or may not be the same as the assistance information that the WTRU currently possesses. For example, the assistance information provided by the network may be same as an existing set of assistance information of the WTRU or may include updates to the existing set of assistance information.

If the network determines that one or more other CNS's are to be selected for the WTRU, the network may determine (e.g., verify) whether it can connect to the CNS's. The determination may be made based on local information possessed or derivable by the network. The local information may include operator defined local policies at an AMF or CCNF, for example. If the determination is that the network can connect to the other CNS's, the network may proceed to perform any of the following actions. The network may deactivate connections between the WTRU and the CNS(s) that is to be replaced. The network may send a deactivation request to the WTRU indicating the connection(s) that is to be deactivated. In the deactivation request, the network may include updated assistance information that may be used by the WTRU to establish a new connection(s) in the place of the connection(s) to be deactivated. The network may send a request to the WTRU to instruct the WTRU to establish a connection(s) with the newly selected CNS(s). The network may send a request to the new CNS(s) (e.g., which may include a new SM function) to instruct the new CNS(s) to activate a connection for the WTRU.

If the network determines that it currently is not connected to the one or more other CNS's, the network may perform one or more of the following actions.

The network may start a timer to disconnect from CNS's that are to be replaced. Upon expiration of the timer, the network may send a request to the WTRU and/or the CNS's to be replaced (e.g., to respective SM functions included in those CNS's) so that connections between the WTRU and those CNS's may be deactivated.

The network may maintain a list of currently active network slices for the WTRU. The network may be configured to update the list, e.g., after the WTRU is disconnected from an existing network slice and/or after a new network slice has been assigned to the WTRU.

The network may send a message (e.g., a response message or a notification message) to the WTRU indicating that a connection with a domain network name (e.g., an access point name or APN) is to be deactivated. The network may include an indication (e.g., such as the duration of a timer) in the message to inform the WTRU when such connection may be deactivated. The network may include a reason for reselecting a CNS in the message.

The network may send updated assistance information to the WTRU. The updated assistance information may be used by the WTRU in one or more subsequent connection requests. The network may, e.g., upon expiration of the timer described above, send a deactivation request to the WTRU to disconnect from a CNS. If no CNS to which the network is connected can continue to serve the WTRU, the network may send an instruction and/or a notification to the WTRU so that the WTRU may act accordingly. In an example, the network may instruct the WTRU to detach from an existing CNS and then re-attach to the same CNS with updated assistance information. In an example, the network may notify the WTRU that no service can be provided by the network (e.g., all CNS's for the WTRU may need to be redirected). In an example, the network may send a request to a default AMF to serve the WTRU. The network may do so upon (e.g., immediately upon) determining that one or more CNS's are to be reselected, or upon receiving a NAS message from the WTRU.

A WTRU may receive a message from a network indicating that a connection is to be deactivated and/or a waiting period before the connection may be deactivated. The WTRU may receive, in a message from the network, new and/or updated assistance information. The WTRU may inform a higher layer about a connection that may be deactivated and a time at which the deactivation may occur. The WTRU may start a timer, and may deactivate (e.g., locally deactivate) an affected connection upon expiration of the timer. If no other connection exists after the deactivation, the WTRU may send a detachment request to the network and/or may locally delete the WTRU temporary identity associated with the network connection. The WTRU may send a new attach message. The WTRU may include new or updated assistance information in a radio message and/or an NAS messages.

The WTRU may update its assistance information in response to receiving information from the network. The WTRU may send a request for a new connection, e.g., using the updated assistance information. The WTRU may include the updated assistance information in a registration message.

A network may select a default CNS and/or a default AMF for a WTRU. The default CNS and/or AMF may be preconfigured. The network may select such a default CNS and/or AMF when the network cannot find a matching CNS and/or AMF for the WTRU based on updated assistance information provided by the WTRU and/or based on updated subscriber information associated with the WTRU. The network may select such a default CNS and/or AMF when no assistance information is provided by the WTRU. In an example, the network may activate a connection between the WTRU and the default CNS. In an example, the network may inform the WTRU to activate a connection with the default CNS and/or AMF. In an example, the network may instruct the WTRU to use updated assistance information that may correspond to the default CNS and/or AMF. In an example, the network may update the WTRU's context, e.g., so that the default CNS and/or AMF may be marked as the WTRU's selected network slice.

A network (e.g., a RAN, an AMF or a CNS) may determine that a different AMF may serve a WTRU. The network may make such a determination based on updated assistance information, for example. The newly determined AMF may serve the WTRU in addition to or in lieu of an existing AMF that is currently serving the WTRU. The newly determined AMF may be a default AMF. Upon determining that the newly determined AMF may serve the WTRU, the network may deactivate the WTRU's connection with the existing AMF. The network may send a deactivation request to a CNS (e.g., to an SM function of the CNS) and/or to the WTRU. The network may indicate, e.g., in the deactivation request, that the network may no longer serve the WTRU. The network may provide the WTRU with updated assistance information.

The network may, upon determining that another AMF may serve the WTRU, send a notification and/or a request to the newly determined AMF indicating that the AMF may serve the WTRU. The notification and/or request may include the WTRU's context and/or the WTRU's updated assistance information. Switching a WTRU from one AMF to another AMF may be considered a "CN slice handover."

A WTRU may delete its temporary identity associated with a network (e.g., with a AMF) and update the WTRU's assistance information. The WTRU may do so, for example, when the WTRU receives a detach notification and/or request from the network. A WTRU may send a registration message (e.g. a new attachment message) to a different AMF after detaching from an existing AMF. The WTRU may resend the registration message periodically. A WTRU may use new and/or updated assistance information in a radio and/or NAS message. A WTRU may keep its temporary identity with a previous AMF. The WTRU may include the temporary identify in NAS messages (e.g., instead of using the temporary identify in lower layers).

Upon determining that another AMF may be selected to serve a WTRU, a network may wait for the WTRU to perform a registration (e.g., a periodic registration) and/or to send an NAS message. The network may receive an NAS message from the WTRU, and may forward the NAS message to the selected AMF (e.g., using a DECOR technique). The network may include the WTRU's new assistance information when forwarding the NAS message. For example, the network may include the NAS message and/or new assistance information in a redirection request sent to a RAN. The network may include an address of the selected AMF in the redirection request.

Figure 5:
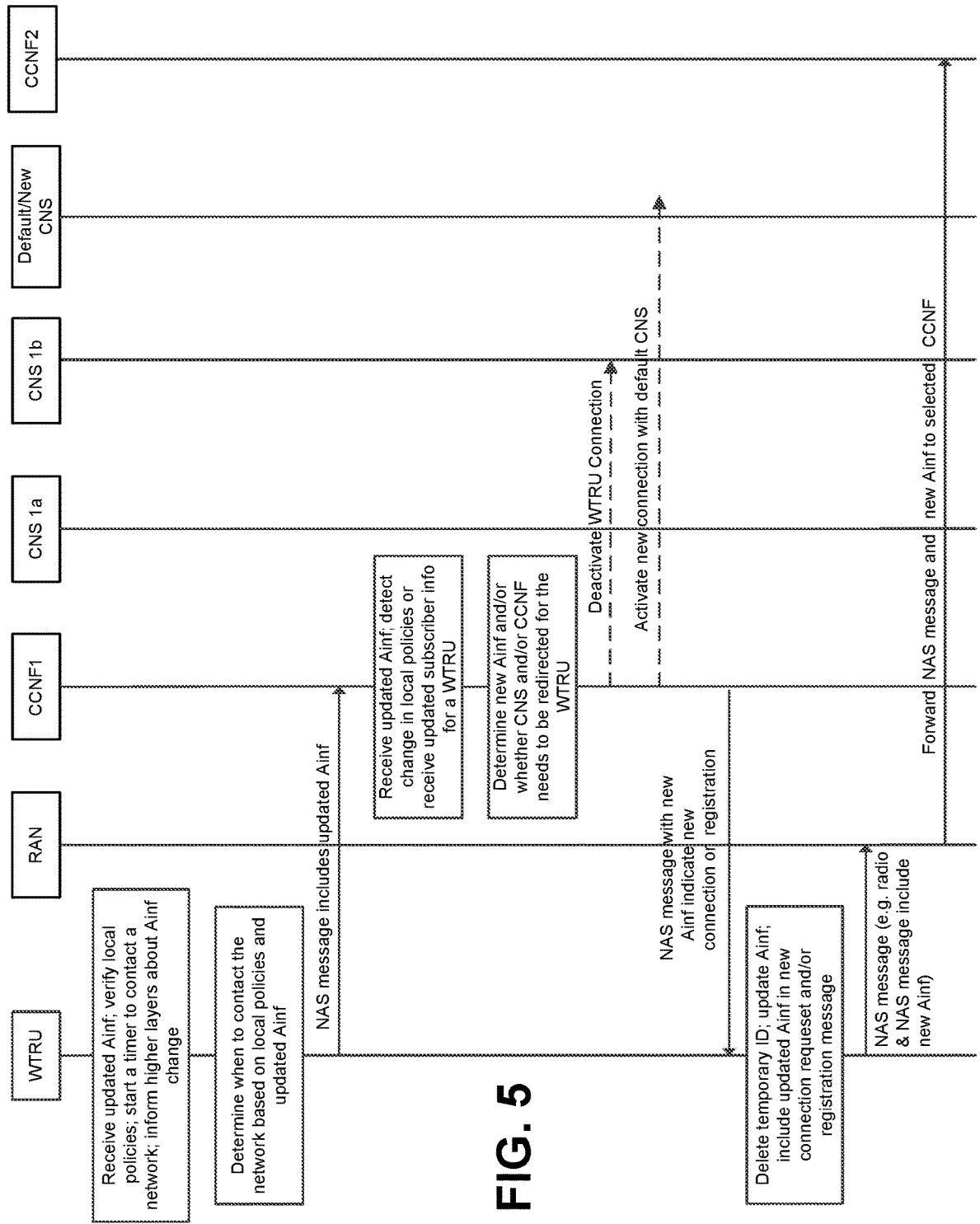
FIG. 5 shows example call flows for network slice reselection.

FIG. 5 shows example call flows for network slice reselection. "Assistance information" is denoted as "Ainf" in the figure.

A back-off mechanism may be implemented, for example to control when and/or how a WTRU may connect to a network slice. The back-off mechanism may be used to prevent a WTRU from connecting to a network slice for a period of time, for example. The back off mechanism may be implemented on a per slice basis.

Figure 6:
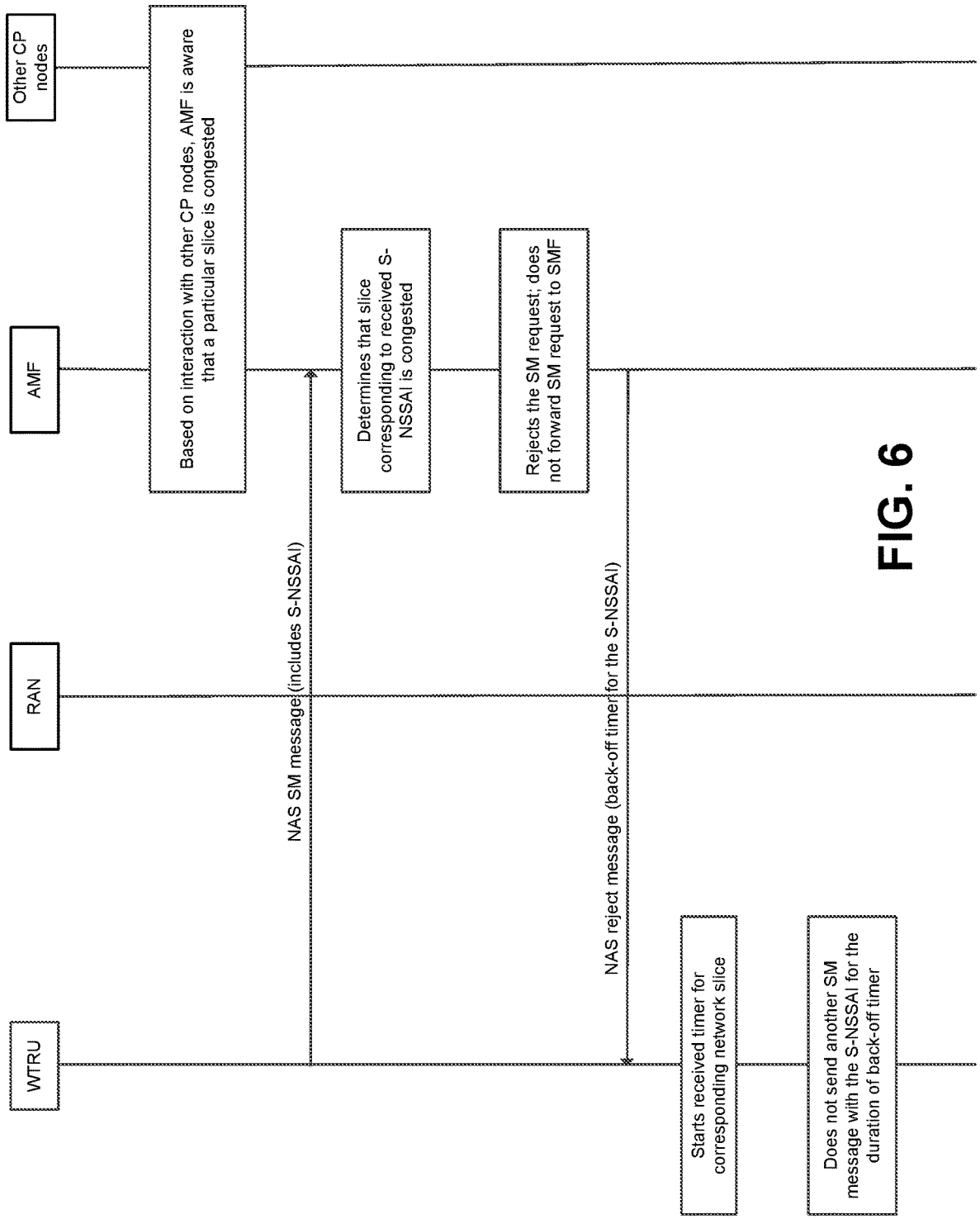
FIG. 6 shows example message flows in an example back-off mechanism related to network slice selection.

FIG. 6 shows example message flows in an example back-off mechanism related to network slice selection and/or reselection. A WTRU may send a request to connect to a dedicated slice, for example, via a session management NAS request message. The request may include single network slice selection assistance information (S-NSSAI). The S-NSSAI may indicate (e.g., identify) a particular network slice with which the WTRU wants to establish a connection. An AMF serving the WTRU may be aware that connections to the particular slice may not be established (e.g., due to a congestion situation at the slice). The AMF may be implemented in a shared control plane part of a network slice, for example. The AMF may become cognizant of the congestion situation based on interaction with other network functions including but not limited to a network slice selection function (NSSF), a network repository function (NRF), a session management function (SMF), and/or other operation and maintenance (O&M) network functions. The AMF may use a local policy, subscription information, and/or the like to decide whether to activate a back-off mechanism (e.g., a back-off timer) in response to the congestion situation and/or the S-NSSAI. The AMF may activate the back-off mechanism on a per slice basis. With the back-off mechanism, the AMF may refrain from forwarding the WTRU's connection request to the dedicated network slice (e.g., to a session management function of the dedicated network slice). The AMF may send a NAS reject message to the WTRU. The AMF may indicate a back-off mechanism (e.g., a back-off timer) to the WTRU, for example as part of the NAS reject message or independently from the NAS reject message.

When a WTRU receives an indication of a back-off mechanism (e.g., a back-off timer) associated with a network slice and/or previously transmitted S-NSSAI, the WTRU may refrain from sending another session management message or S-NSSAI to the network for the duration of the back-off timer. The WTRU may take various actions upon receiving an indication of a back-off mechanism. For example, the WTRU may halt the back-off mechanism (e.g., the WTRU may stop a back-off timer) in certain scenarios. Greater detail about the actions that may be taken by a WTRU in response to receiving an indication of a back-off mechanism are provided below.

The back-off timer described herein may be sent by an AMF. The AMF may send the back-off timer upon receiving a mobility management message from a WTRU. The mobility management message may be a service request message or a registration request message (e.g., a tracking area update (TAU) request), for example. The mobility management message may include a PDU session ID that may point to one or more established PDU sessions. The AMF may send the back-off timer in a mobility management (MM) accept NAS message to the WTRU, in a MM reject NAS message to the WTRU, and/or the like. The NAS message may include an indication that the back-off timer may apply to WTRU-originated signaling for a particular dedicated network slice or slice instance. Different back-off timer values may be set for different slices. The WTRU may be instructed to back-off from connecting to a first slice. The WTRU may be allowed to establish a connection with a second slice during a back-off period associated with the first slice.

A WTRU may perform one or more actions upon receiving a back-off indication (e.g., a back-off timer) for a network slice. For example, upon receiving a back-off indication, the WTRU may cease sending session management requests for the slice that corresponds to the received back-off mechanism. Such a slice may be associated with certain S-NSSAI transmitted by the WTRU, for example. Upon receiving an indication for a back-off mechanism, the WTRU may refrain from re-activating (e.g., the WTRU may stop re-activating) an inactive PDU session for a congested slice or congested NSSAI via a service request. For example, the WTRU may not include a PDU session ID in a service request message or in a mobility management message for the PDU session that is connected to an active slice. Upon receiving a back-off indication, the WTRU may implicitly deactivate (e.g., without further signaling with the network) an active PDU session and/or an inactive PDU session associated with a congested slice.

A WTRU may receive an explicit indication of a back-off timer (e.g., from the network and/or an AMF). The indication may instruct the WTRU to deactivate an inactive PDU session associated with a congested slice. The indication may instruct the WTRU to deactivate active and/or inactive PDU sessions associated with a congested slice. The WTRU may request a new network slice selection policy (NSSP), e.g., from a policy function. The policy function may reside in a network, for example. When requesting the new NSSP, the WTRU may indicate that a particular slice is congested. The policy function may provide a new NSSAI/S-NSSAI for the WTRU, e.g., upon receiving a request for a new NSSP from the WTRU. The WTRU may send a PDU session request (e.g., a session management request) with the new S-NSSAI received from the policy function.

A WTRU may stop a back-off mechanism (e.g., a back-off timer) under certain conditions or in response to a triggering event. For example, a WTRU may stop a back-off timer when the WTRU performs a handover from a 5G system (e.g., an AMF of a 5G system) to an evolved packet core (EPC) system (e.g., an MME). A WTRU may stop the back-off timer when the WTRU receives, from a network, an attach accept message, a TAU accept message, and/or any other mobility management message that includes accepted NSSAI and the accepted NSSAI does not include a congested S-NSSAI value. The WTRU may stop the back-off timer when the WTRU is paged by a network for a PDU session that belongs to a congested slice. The WTRU may stop the back-off timer when the WTRU is paged by a network for session management signaling associated with a PDU session that belongs to a congested slice. The WTRU may stop the back-off timer when the WTRU receives an explicit indication informing the WTRU that a congestion situation no longer exists in the corresponding network slice. The explicit indication may be received from an AMF. The explicit indication may be received via mobility management signaling or session management signaling, for example.

A WTRU may generate session management signaling for a congested slice or a slice that corresponds to a congested S-NSSAI if the WTRU has data to transmit and/or receive for an emergency service or a high priority service. In these cases, the WTRU may send a high priority indication or an emergency request indication to a network. The indication may be included in a NAS message to the network, for example. Upon receiving the indication, the network (e.g., an AMF of the network) may forward session management messages to a network slice even if the network slice is congested.

As described herein, a CNS may include a session management (SM) function. The SM function may be operable to provide a connection to a WTRU when the WTRU attempts to establish a connection with a data network. A WTRU may be associated with one or more CNS's. The SM functions of the one or more CNS's may provide multiple connections for the WTRU. The multiple connections may be independent of each other. The connections may be maintained even when the WTRU is in an idle state. For example, the context of the connections may be maintained while the WTRU is in the idle state such that further signaling may not be needed to reactivate (e.g., set up) the connections. When the WTRU transitions from the idle mode to a connected mode, the WTRU may readily use previously established connections (e.g., tunnels) to transport data packets (e.g., IP packets).

A WTRU with multiple connections may not have data to transmit/receive on all of the connections. Thus, it may be inefficient to generate signaling to set up connection resources (e.g., tunnels) that the WTRU may not use. To improve efficiency, the WTRU may be configured to set up resources only for connections that the WTRU may use, and to avoid unnecessary signaling. For example, as shown in FIG. 3, a WTRU associated with network slices A and B may only have data to transmit over network slice A when the WTRU transitions from an idle mode to a connected mode. In such scenarios, the WTRU and/or the network may be configured to not generate signaling for setting up resources for network slice B.

A WTRU may be configured to reduce unnecessary signaling to and from network slices. For example, a WTRU may have multiple PDN connections. The WTRU may inform a network about which connection(s) the WTRU may use when the WTRU transitions from an idle mode to a connected mode. The WTRU may inform the network about the connection(s), for example, by doing one or more of the following. The WTRU may send the network an APN or Domain Network Name identifier associated with a connection. The WTRU may send the network a slice identity associated with a connection. The WTRU may send the network a service or application ID associated with a connection. The WTRU may send the network assistance information that may identify a connection.

A WTRU may be configured with a policy specifying which network slice(s) the WTRU may use while transitioning from an idle mode to a connected mode. For example, the policy may provide that the WTRU may indicate to a network that the WTRU may use all of its slices even though data may not be available for some of the slices.

A network may set up resources for the connection(s) or network slice(s) that the WTRU indicates it may use (e.g., in response to receiving the aforementioned indication from the WTRU). The network may maintain context (e.g., an IP address) for the connection(s) or network slice(s) that the WTRU indicates it may not use. The network may trigger signaling in the network slice(s) that the WTRU indicates it may use.

A network may verify whether a slice request from a WTRU may be granted. A network may apply its own policy when setting up resources for a WTRU. A network may choose to set up resources for a slice that is different from the slice(s) requested by a WTRU.

A WTRU (e.g., while in a connected mode) may desire to use a connection that is not currently used by the WTRU. The WTRU may send an NAS message (e.g., such as a mobility management or session management message) to a network. The NAS message may indicate that the WTRU desires to establish connection with a certain network slice. The network may, e.g., upon receiving the NAS message, use procedures preconfigured within a network slice to set up resources for the WTRU. The network may send a response to a WTRU to indicate the outcome of a slice connection request. The response may include a connection ID (e.g., a temporary ID), which may be indicative of the resources that have been set up for a particular connection or slice.

Systems, methods, and instrumentalities have been disclosed for network slice selection and/or reselection. A WTRU may receive updated assistance information for network slice selection. A WTRU may be configured with local policies and may determine when to send updated slice selection information to the network based on the local policies. A WTRU may receive updated assistance information from a serving network. A WTRU may delete a temporary ID associated with a network and may re-attach to the network using updated assistance information. A network may determine that a slice associated with a WTRU may be reselected. A network may determine whether part or all of a slice may be reselected, for example, depending on whether the WTRU may be served by a partial slice. A network may select an additional or different slice for a WTRU when the network determines that an existing slice may no longer serve a PDN connection of the WTRU (e.g., the existing slice may still generally support the category of devices that the WTRU belongs to). The additional or different slice may be a default slice configured to provide a default connection for the WTRU. A network may provide a WTRU with new assistance information. A network may indicate that a re-attach may be implemented, for example, when a slice may not serve a WTRU.

The processes and instrumentalities described herein may apply in any combination, may apply to other wireless technologies, and for other services. A WTRU may refer to an identity of the physical device, or to the user's identity such as subscription related identities, e.g., MSISDN, SIP URI, etc. A WTRU may refer to an application-based identity such as a user name that may be used for each application. The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method implemented in a wireless transmit/receive unit (WTRU), the method comprising:
receiving a message from a network the WTRU is registered with, wherein the message comprises updated assistance information for access the network;
determining, based on the updated assistance information, that a set of network slices associated with the WTRU are to be modified;
updating network slice selection assistance information (NSSAI) based on the updated assistance information;
determining at least a portion of the updated NSSAI to be included in a registration message;
determining, based on the received message, that an immediate registration is needed; and
transmitting the registration message comprising at least the portion of the updated NSSAI.

2. The method of claim 1, wherein the updated NSSAI identifies a type of service provided by at least one network slice of the set of network slices.

3. The method of claim 2, wherein the type of service includes any of: an enhanced Mobile Broadband (eMBB) service, an ultra-reliable low latency communications (URLLC) service, and a massive Internet of Things (mIoT) service.

4. The method of claim 1, further comprising waiting for a duration of a back-off timer before contacting an access and mobility management function (AMF) to establish a connection to a network slice of the set of network slices.

5. The method of claim 1, wherein the updated assistance information comprises an indication to the WTRU to re-register with the network using the updated assistance information.

6. The method of claim 1, further comprising:
transmitting an acknowledgement to the network upon receiving the updated assistance information.

7. The method of claim 1, wherein updating the NSSAI comprises replacing current assistance information with the updated assistance information.

8. The method of claim 1, wherein determining the immediate registration being needed comprises:
determining the updated assistance information to be used by the WTRU to connect, immediately after receiving the updated assistance information, to a network slice of the set of modified network slices.

9. The method of claim 1, wherein determining at least the portion of the updated NSSAI to be included in the registration message comprises checking one or more policies to determine a type of the updated NSSAI to be included in the registration message.

10. The method of claim 9, wherein the one or more policies include information regarding a list of one or more network slices that the WTRU is permitted to access.

11. The method of claim 1, wherein the registration message is transmitted without a temporary identifier associated with an access and mobility management function (AMF) of the network.

12. A wireless transmit/receive unit (WTRU) comprising:
a processor configured to:
receive a message from a network the WTRU is registered with, wherein the message comprises updated assistance information for access the network;
determine, based on the updated assistance information, that a first set of network slices associated with the WTRU are to be modified;
update network slice selection assistance information (NSSAI) based on the updated assistance information;
determine at least a portion of the updated NSSAI to be included in a registration message;
determine, based on the received message, that an immediate registration is needed; and
transmit the registration message comprising at least the portion of the updated NSSAI.

13. The WTRU of claim 11, wherein the updated NSSAI identifies a type of service provided by at least one network slice of the set of network slices.

14. The WTRU of claim 12, wherein the updated assistance information comprises an indication to the WTRU to re-register with the network using the updated assistance information.

15. The WTRU of claim 12, wherein the processor is configured to transmit an acknowledgement to the network upon receiving the updated assistance information.

16. The WTRU of claim 12, wherein the processor is configured to replace current assistance information with the updated assistance information.

17. The WTRU of claim 12, wherein the processor is configured to determine the updated assistance information to be used by the WTRU to connect, immediately after receiving the updated assistance information, to a network slice of the set of modified network slices.

18. The WTRU of claim 12, wherein the processor is configured to check one or more policies to determine a type of the updated NSSAI to be included in the registration message.

19. The WTRU of claim 18, wherein the one or more policies include information regarding a list of one or more network slices that the WTRU is permitted to access.

20. The WTRU of claim 12, wherein the registration message is transmitted without a temporary identifier associated with an access and mobility management function (AMF) of the network.

* * * * *